US009489794B2

(12) United States Patent
Hilbert et al.

(10) Patent No.: US 9,489,794 B2
(45) Date of Patent: Nov. 8, 2016

(54) SYSTEMS AND METHODS FOR PROVIDING CONTROL OF A WAGERING DEVICE USING A SMARTPHONE OR MOBILE DEVICE

(71) Applicant: Bally Gaming, Inc., Las Vegas, NV (US)

(72) Inventors: Scott Thomas Hilbert, Sparks, NV (US); Joseph Randall Hedrick, Reno, NV (US); Ramesh Vivek, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 8 days.

(21) Appl. No.: 14/334,379

(22) Filed: Jul. 17, 2014

(65) Prior Publication Data

US 2015/0133219 A1 May 14, 2015

Related U.S. Application Data

(60) Provisional application No. 61/902,551, filed on Nov. 11, 2013.

(51) Int. Cl.
*A63F 13/323* (2014.01)
*G07F 17/32* (2006.01)

(52) U.S. Cl.
CPC ................................ *G07F 17/3211* (2013.01)

(58) Field of Classification Search
CPC .......... G07F 17/3216; G07F 17/3218; G07F 17/3225; G07F 17/3211
USPC ............................................ 463/31, 40, 47
See application file for complete search history.

(56) References Cited

U.S. PATENT DOCUMENTS 8,460,103 B2 6/2013 Mattice et al.
2004/0152509 A1* 8/2004 Hornik .................... G07F 17/32 463/20
2007/0111800 A1* 5/2007 Tyndall ................... G07F 17/32 463/42
2011/0263318 A1* 10/2011 Agarwal ................ G06Q 20/32 463/25
2013/0130777 A1* 5/2013 Lemay ................ G07F 17/3218 463/25
2013/0337878 A1* 12/2013 Shepherd ............ G07F 17/3225 463/11
2014/0141864 A1* 5/2014 Ward .................. G07F 17/3225 463/25

* cited by examiner

*Primary Examiner* — Allen Chan
(74) *Attorney, Agent, or Firm* — Marc D. Thompson

(57) ABSTRACT

Gaming systems and methods are set forth for players to link a player mobile communication device such as a Smart phone to a gaming terminal to present at the player mobile communication device display an auxiliary or substitute player interface for controlling the game.

17 Claims, 12 Drawing Sheets

SYSTEMS AND METHODS FOR PROVIDING CONTROL OF A WAGERING DEVICE USING A SMARTPHONE OR MOBILE DEVICE

CROSS REFERENCE TO RELATED APPLICATIONS

This application is a non-provisional application that claims priority from Provisional Application No. 61/902,551 filed Nov. 11, 2013 and is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The field of the invention relates to systems and methods for controlling and directing the operation of a gaming device or gaming terminal using a player's smartphone, tablet or other mobile device.

2. Background

For many years gaming terminals were constructed and configured to provide for the play by a player sitting in front of the machine and interacting through buttons, handles and touch screen. For example, gaming devices includes a button panel through which the player may input a wager, select their wager parameters such as pay lines and initiate play. The initiation of play was for many years accomplished by the player pulling a handle to cock the mechanical drive mechanism to rotate mechanical reels. Modernly the handle triggers a switch to initiate play. A play and "repeat bet" button on the button panel may also initiate play. More recently touch screen displays have enabled players to provide controlling input to the gaming terminal such as selecting wagers, the wagered upon proposition as well as initiate play and cash out their winnings, for example. The touch screen also enable the player to interact with secondary or bonus games by making selections toward achieving a result.

A drawback of gaming devices is that the player must sit at the gaming terminal in a position to operate the buttons. The player may have to reach to the touch screen or to reach the buttons in the case of a smaller player. The players may not easily change their seating position without having to turn to reach the buttons. Furthermore game control mechanics are limited by the buttons and touch screen configurations.

Some gaming terminals include large displays or secondary displays which cannot be easily reached by players to interact with them. For example a game may trigger a secondary game on a secondary display above the primary display. The player must interact with the secondary display through the button panel or primary display touch screen since they cannot reach the secondary display.

Furthermore inasmuch as gaming terminal buttons and screen are touched by many people there is a likelihood of transmitting a virus or other disease between players.

In a heretofore unrelated field modernly many individuals have Smartphones, tablet computers, mini table computers and similar mobile devices such as cellular telephones which include Broadband, Internet and near field communication capabilities.

It would be advantageous if a system and method could be provided to enable a player to control the action at a gaming terminal by and through a player's own mobile device. In this instance the player would not need to repeatedly touch buttons and screen touched by previous player and could sit in any comfortable position without having to reach the buttons/screens.

It would also be advantageous if a system and method could be provided to enable a player to control the action at a secondary display or a remote location on a large display in a portrait mode by and through a player's own mobile device.

It would further be advantageous if a system and method could be provided to enable a player to control the action at a gaming terminal by and through a player's own mobile device and to utilize the axis sensors of the mobile device in controlling the gaming device to provide unique features and presentations. For example a player may use their mobile device to simulate steering a vehicle which is displayed on the gaming device to play a secondary or feature game. The player may also use gesture motion of the portable device to simulate the pull of the gaming terminal play prompt handle and to make selections or control other action.

In regards to the above it would be advantageous to provide a system and method for uniquely linking a player's mobile device to the gaming device for play and to avoid multiple linkages to several nearby gaming devices or corruption of control of neighboring machines by other players.

It would also be advantageous to enable a player to capture a play or screen display to their portable device for example to memorialize a jackpot win.

SUMMARY OF THE INVENTION

There is, therefore, provided in accordance with one aspect of the present invention a system and method for providing for a player to control player inputs for a gaming terminal using a player mobile communication device (PMCD) including a video display and a wireless communicator. The gaming terminal includes a game display and a player interface. The system and method includes a wireless communication device associated with the gaming terminal. In an embodiment a wireless communication device such as a Bluetooth (and the various implementations thereof) is provided in or at the gaming terminal or in a system interface device for the gaming terminal such as a button panel or button deck. The wireless communication device configured to establish a communication link between a players's PMCD and the gaming terminal or at least the player interface for the gaming terminal. One or more software applications exiting in the gaming terminal and PMCD are configured to control the gaming terminal (or at least the player interface) and the player's PMCD to establish a near field communication link between the player's PMCD and the wireless communication device associated with the gaming terminal to (a) control the mobile communication device and the gaming terminal to one of (i) share and (ii) relinquish control of said player interface to player's PMCD and (b) control the PMCD to display a gaming terminal interface. Once the communication link is established the player may control and interact with the player interface to control various features of the gaming terminal. These features include prompting play, e.g. initiating a spin or play, entering wagers, selecting game wager propositions, providing inputs and feedback for game features, changing games in a multi-game terminal, interacting with touch screen interfaces, cashing out and the like.

In a further embodiment one or more software applications are configured to control a video display at the gaming terminal to display an image such as a glyph or bar code. The player's PMCD is configured by a suitable application to receive data from the PMCD camera when the player takes a picture of the glyph. Processing the data, and in cooperation with the gaming terminal, the PMCD establishes the communication link.

There is also set forth is a casino enterprise system including a host server configured to communicate via one or more of an Internet network, a Broadband communication network and a near field communication network with player mobile communication devices (PMCD), a plurality of gaming terminals in communication with the host server over a private network each having a video display an a player input interface enabling a player to interface with a selected gaming terminal and wherein the PMCD includes a PMCD display and a camera. The system includes a near field wireless communication device associated with the gaming terminals, the near field wireless communication device configured to establish a unique communication link between a PMCD and a player selected gaming terminal when the player is at the selected gaming terminal. One or more software applications are configured to control the player's PMCD and the selected gaming terminal to one of (i) share and (ii) relinquish control of said player interface to the player's PMCD and (b) control the PMCD to display at the PMCD a gaming terminal interface whereby the player may control the interface with said gaming terminal through said PMCD.

In an embodiment one or more software applications are configured to control a video display at the gaming terminal to display an image such as a glyph or bar code. The player's PMCD is configured by a suitable application to receive data from the PMCD camera when the player takes a picture of the glyph. Processing the data, and in cooperation with the gaming terminal, the PMCD establishes the communication link.

Other features and numerous advantages of the various embodiments will become apparent from the following detailed description when viewed in conjunction with the corresponding drawings.

DETAILED DESCRIPTION

While the present invention is primarily described with reference to a casino enterprise, it should be understood that the present invention and its various embodiments could be extended to other enterprises such as stores, service providers or other businesses which deal with repeat business customers and which desire to foster customer loyalty, entice the customer interaction and to expand their customer base.

Figure 1:
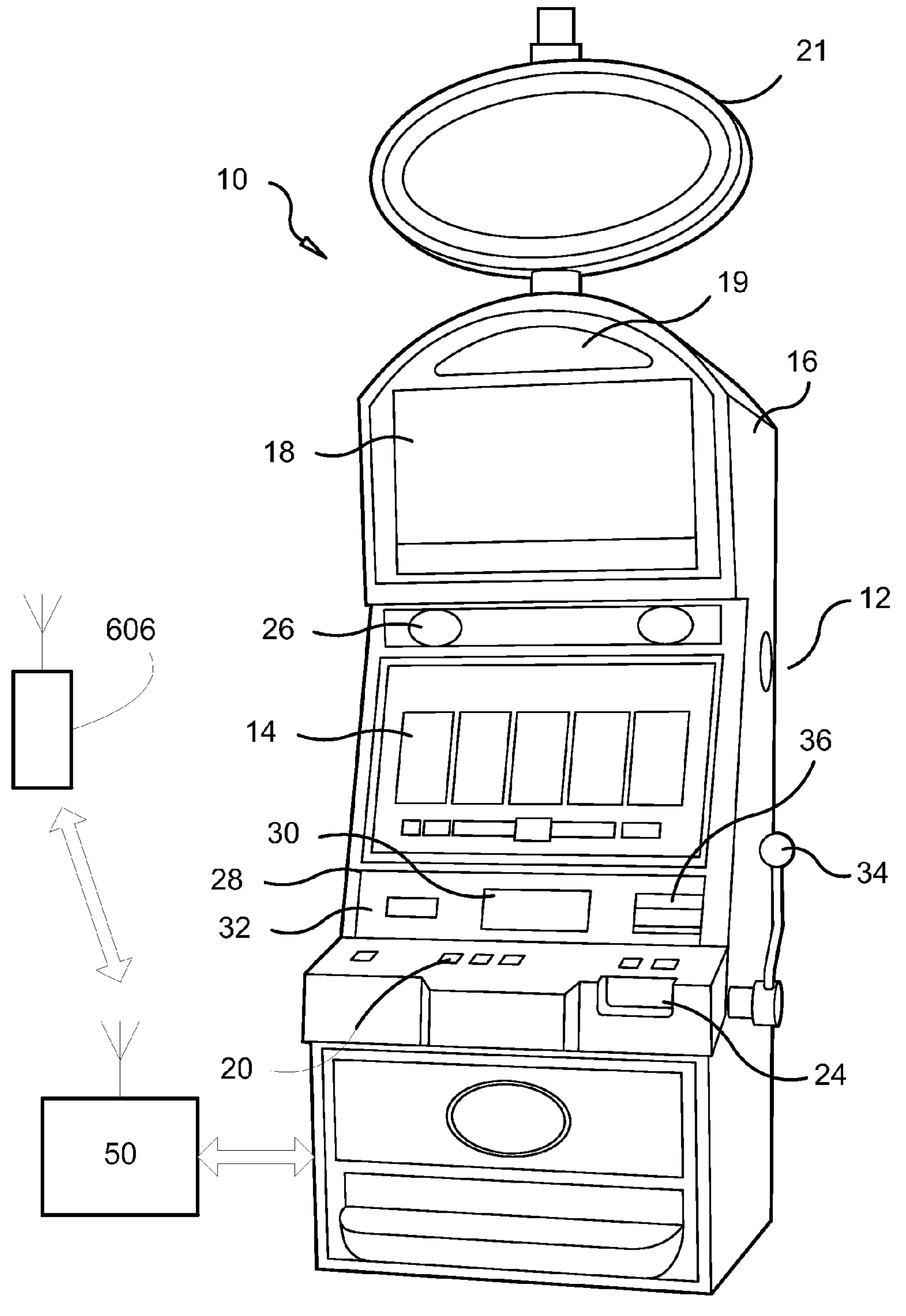
FIG. 1 illustrates a gaming terminal.

Referring now to the drawings, wherein like reference numbers denote like or corresponding elements throughout the drawings, and more particularly referring to FIG. 1, a gaming terminal 10 according to one or more embodiments of the present invention is shown. The gaming terminal 10 is configured, as is well known, to accept a wager, provide for the play of a game and produce (usually randomly, pseudo-randomly) a winning or losing outcome. For a losing outcome the player receives no award. For a winning outcome the player receives an award usually an award measured in game credits. For certain jackpot awards a "hand pay" in cash by casino personnel may be required.

The gaming terminal 10 may be configured for the play of a single game or multiple games from which a player may select a desired game to play. To play the game various inputs/selections are required from the player. For example, the player may select the amount to wager, the wagering proposition(s) (lines in a slot machine game, numbers in a video keno game, whether to bet Banker, Player or Tie in a video Baccarat game or the like) as well interacting during the play of a feature or bonus game such as selecting icons, controlling a virtual character or vehicle or the like.

As suggested the gaming terminal 10 may be a video gaming machine, an electro-mechanical stepper gaming machine and may be a Las Vegas style Class III or a Class II gaming machine or video lottery terminal.

The gaming terminal 10 includes a cabinet 12 providing an enclosure for the several components of the gaming terminal 10 and associated equipment. A primary game display 14 is mounted to the cabinet 12. The primary game display 14 may be a video display such as an LCD, plasma, OLED or other electronic display or it may be an electro-mechanical display such as electro-mechanical stepper reels as are known in the art. The primary game display 14 may also be embodied as a combination of two or more electronic or mechanical displays disposed in an adjacent overlapping or overlying arrangement. The primary game display 14 may be mounted to one or more of a door for the cabinet 12 or the cabinet chassis itself. The primary game display 14 is located to display game content (and if desired other content) to the player. For example, the game content may be game outcomes presented by a plurality of video or electromechanical reels displaying symbols the combinations of which define winning or losing outcomes, video Poker, Keno or other form of base casino wagering game as is known in the art. Where the primary game display 14 is a video display, features such as bonus/feature games may also be presented. The foregoing description should not be deemed as limiting the content (graphics, video or text) which can be displayed at the primary game display 14. The cabinet 12 may comprise a slant-top, bar-top, or table-top style cabinet as is known in the art.

The gaming terminal 10 also includes in one or more embodiments a top box 16 which may support a printed back-lit glass (not shown) as is known in the art depicting the rules, award schedule, attract graphics or it may support a secondary game display 18 which may be of one of the types described above with reference to the primary game display 14. The top box 16 may also support a backlit glass with graphics defining a marquee 19 and a topper 21 including additional graphics.

To enable a player to provide input to the controller for the gaming terminal 10 a player interface including a plurality of buttons 20 may be provided on a button deck for the gaming terminal 10. Additionally and alternatively one or both of the primary and secondary game displays 14, 18 may include touch screen player interface functionality as is known in the art. Buttons, selections or inputs are displayed at the primary and secondary game displays 14, 18 and the player touching those icons or designated areas provides the required or desired input to configure and play the gaming terminal 10.

Other peripherals or associated equipment for the gaming terminal 10 include a bill/voucher acceptor 24 which reads and validates currency and vouchers for the player to establish credits for gaming on the gaming terminal 10 and one or more speakers 26 to provide audio content to the player in association with the game play. To provide for communication between the gaming terminal 10 and a casino system, a player tracking module (PTM) 28 is mounted on the cabinet 12. PTM 28 has a PTM display 30 to display system related information to the player. The PTM display 30 may be a small LCD, plasma or OLED display with touch screen interface functionality to enable the player to communicate with the system such as by entering a prompt or responding to a system delivered query. In an embodiment the user interfaces described herein are displayed at the PTM display 30; however, as set forth below these presentations can be migrated to the primary or secondary displays 14, 18. A card reader 32 is provided to read a machine readable component on a player loyalty card (not shown) issued to the player to identify the player to the casino system as in known in the art. A ticket printer 36 may be provided as well on the PTM 28 or elsewhere on the gaming terminal 10 to provide printed value ticket vouchers to players when they cash out as is also known in the art.

The display and functionality of the PTM 28 may be migrated to the primary display 18 as is disclosed in Kelly et al, U.S. Pat. No. 8,241,123 titled "Video Switcher and Touch Router Method for a Gaming Machine" issued Aug. 14, 2012 and Kelly et al U.S. Pat. No. 8,241,124 titled "Gaming Machine Having a Curved Display With a Video Switcher and Touch Router System", issued Aug. 14, 2012 the disclosures of which are hereby incorporated by reference. According to these disclosures system and externally based content may be displayed at one or more of the primary or secondary displays 14, 18 dispensing with the need for the PTM display 30. Accordingly it should be understood that the display of information recited herein could be displayed at regions at one or more of the primary or secondary displays 14, 18 in lieu of display at the PTM display 30.

While the player may use the buttons 20 to prompt play of the game (or the touch screen input), alternatively the player may use a handle 34 to prompt an input as is known in the art.

Cabinet 12 may be a self-standing unit that is generally rectangular in shape and may be manufactured with reinforced steel or other rigid materials which are resistant to tampering and vandalism. Any shaped cabinet may be implemented with any embodiment of gaming terminal 10 so long as it provides access to a player for playing a game. For example, cabinet 12 may comprise a slant-top, bar-top, or table-top style cabinet, including a Bally Cinevision™ or CineReels™ cabinet. The gaming terminal 10 may include a controller and memory disposed within the cabinet 12 or may have thin client capability such as that some of the computing capability is maintained at a remote server.

The player interface including the plurality of player-activated buttons 20 may be used for various functions such as, but not limited to, selecting a wager denomination, selecting a game to be played, selecting a wager amount per game, initiating a game, or cashing out money from gaming terminal 10. Buttons 20 may be operable as input mechanisms and may include mechanical buttons, electromechanical buttons or touch screen buttons. In one or more embodiments, buttons 20 may be replaced with various other input mechanisms known in the art such as, but not limited to, touch screens, touch pad, track ball, mouse, switches, toggle switches, or other input means used to accept player input. For example, one input means is as disclosed in U.S. Pub. App. 2011/0111853, entitled "Universal Button Module," filed on Jan. 14, 2011 and/or the virtual button deck (sold by Bally Gaming, Inc d/b/a/ Bally technologies as the iDeck™ device) or other input means U.S. Pub. App. 2010/0113140 entitled "Gesture Enhanced Input Device" filed Nov. 16, 2009 which are hereby incorporated by reference. Player input may also be by providing touch screen functionality at the primary game display 14 and/or secondary game display 18.

Figure 2A:
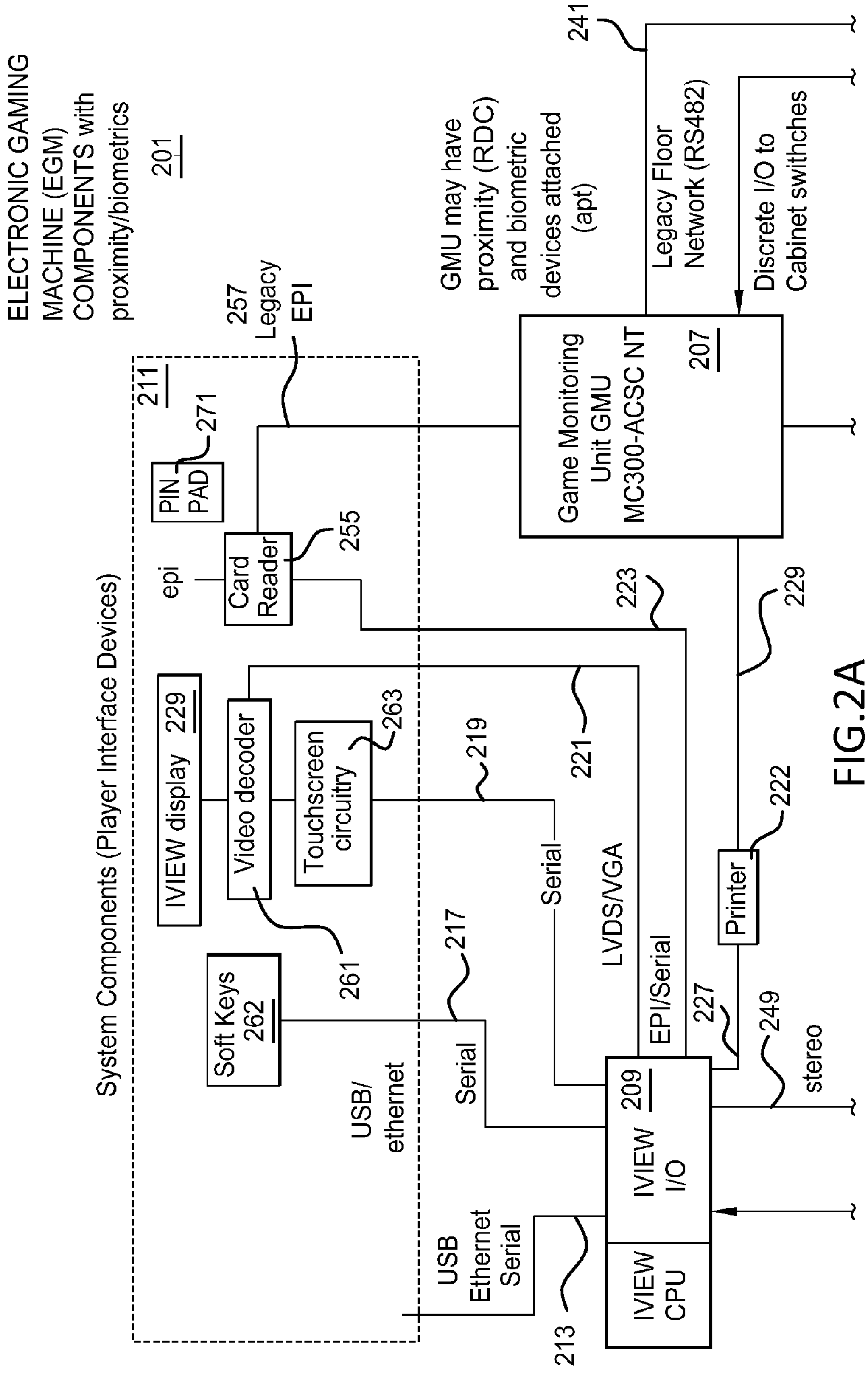
FIGS. 2A-B illustrate an example of a gaming terminal operational platform and components for a gaming terminal of the type of the present invention.
Figure 2B:
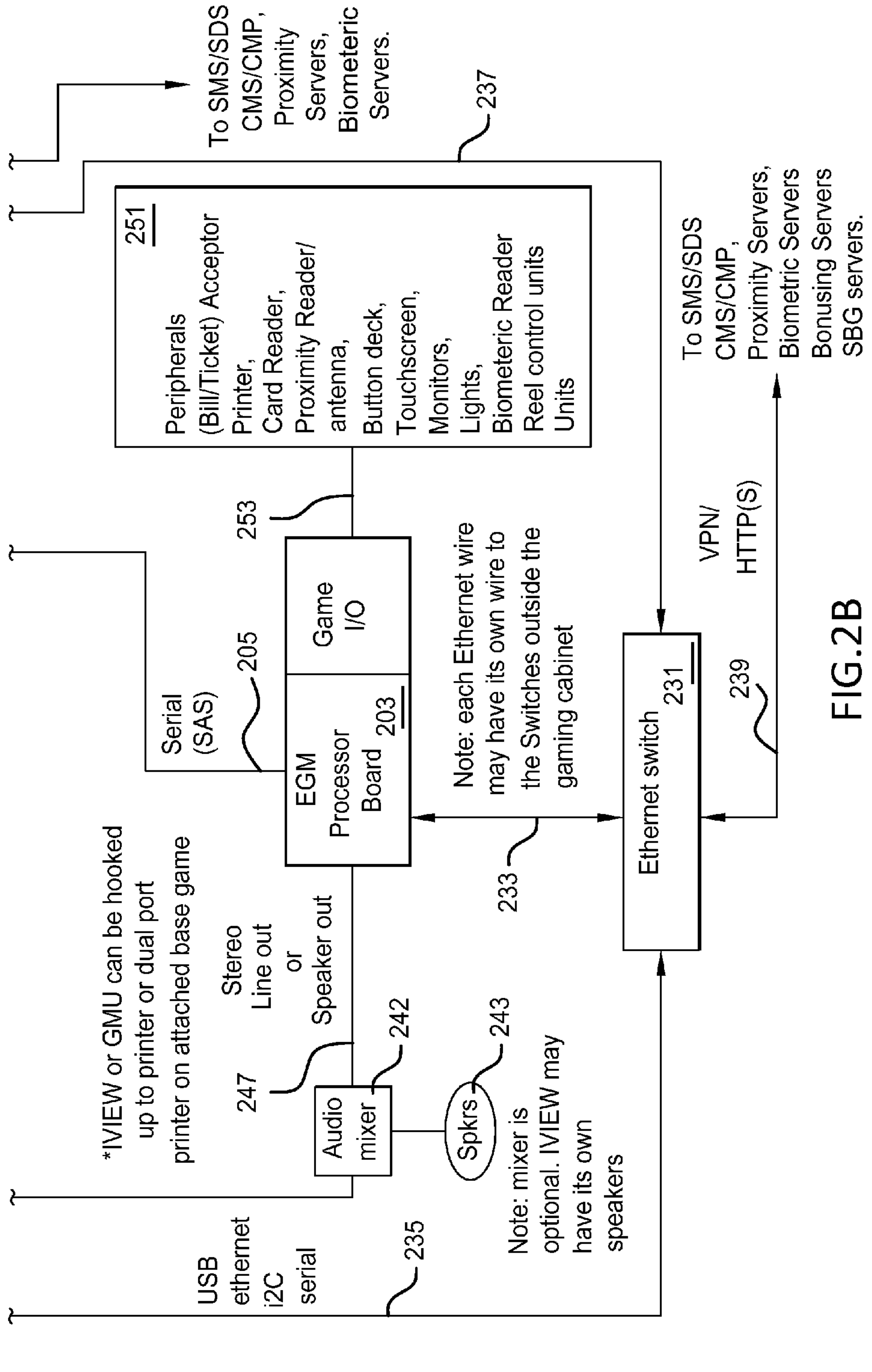

Referring to FIGS. 2A, B, the gaming terminal 10 hardware 201 for the controller(s) is shown in accordance with one or more embodiments. The hardware 201 includes base game processor board 203 (EGM Processor Board) connected through serial bus line 205 to game monitoring unit (GMU) 207 (such as a Bally MC300 or ACSC NT manufactured and sold by Bally Gaming, Inc., Las Vegas, Nev.). EGM Processor Board 203 is connected to the PID 209 over bus line 249 and PID 209 is connected to the iView device such as 211 in FIG. 2A through bus lines 213, 217, 219, 221, 223. The PID 209 provides for communication between one or more gaming terminals 10 and the casino system such as the type as hereinafter described. Inasmuch as gaming terminals 10 may be manufactured by different entities, mounting like PTMs 28, 211 and PIDs 209 at each gaming terminal 10 provides for communication to the system in one or more common message protocols. Typically when a casino enterprise purchases a casino management system they also purchase the same manufacturer's PTMs 28, 211 and PIDs 209 which are then installed by the various manufacturers of the gaming terminals 10 for the enterprise before delivery. In this manner the mountings for the PTMs 28, 211 on the gaming terminals can be configured for location and esthetic appearance. Gaming voucher ticket printer 36 (for printing player cash out tickets) (shown as 222 in FIG. 2A) is connected to PID 209 and GMU 207 over bus lines 227, 229. EGM Processor Board 203, PID 209 and GMU 207 connect to Ethernet switch 231 over bus lines 233, 235, 237. Ethernet switch 231 connects to a slot management system and a casino management system (SMS, SDS, CMS and CMP) (FIGS. 4A, 4B) network over bus line 239. Ethernet switch 231 may also connect to a server based gaming server or a downloadable gaming server. GMU 207 also may connect to the network over bus line 241. Speakers 26 (shown as 243 in FIG. 2B) to produce sounds related to the game or according to the present invention connect through audio mixer 242 and bus lines 247, 249 to EGM Processor Board 203 and PID 209.

Peripherals 251 connect through bus 253 to EGM Processor Board 203. The peripherals 251 include, but are not limited to the following and may include individual processing capability: bill/voucher acceptor 24 to validate and accept currency and ticket vouchers, the player interfaces such a buttons 20, primary and secondary game displays 14, 18 and any secondary or tertiary displays (with/without) touch screen functionality, monitors and lights. The peripherals 251 may include the displays as hereinafter described with reference to the various embodiments of the present invention as herein described or their equivalents. For example, the bill/voucher acceptor 24 is typically connected to the game input-output board of the EGM processing board 203 (which is, in turn, connected to a conventional central processing unit ("CPU") board), such as an Intel Pentium® microprocessor mounted on a gaming motherboard. The I/O board may be connected to CPU processor board 203 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. EGM processor board 203 executes a game program that causes the gaming terminal 10 to display and play a game. The various components and included devices may be installed with conventionally and/or commercially available components, devices, and circuitry into a conventional and/or commercially available gaming terminal cabinet 12.

When a player has inserted a form of currency such as, for example and without limitation, paper currency, coins or tokens, cashless tickets or vouchers, electronic funds transfers or the like into the currency acceptor, a signal is sent by way of bus 253 to the I/O board and to EGM processor board 203 which, in turn, assigns an appropriate number of credits for play in accordance with the game program. The player may further control the operation of the gaming machine by way of other peripherals 251, for example, to select the amount to wager via the buttons 20. The game starts in response to the player operating a start mechanism such as the handle 34, button 20 such as a SPIN/RESET button or a touch screen icon. The game program includes a random number generator to provide a display of randomly selected indicia on one or more displays such as the primary game display 14 as shown in FIG. 1. In some embodiments, the random generator may be physically separate from gaming terminal 10; for example, it may be part of a central determination host system which provides random game outcomes to the game program. Finally, EGM processor board 203 under control of the game program and OS compares the outcome to an award schedule. The set of possible game outcomes may include a subset of outcomes related to the triggering and play of a feature or bonus game. In the event the displayed outcome is a member of this subset, EGM processor board 203, under control of the game program and by way of I/O Board, may cause feature/bonus game play to be presented on the primary game display 14 and/or any secondary display(s) 18.

Predetermined payout amounts for certain outcomes, including feature game outcomes, are stored as part of the game program. Such payout amounts are, in response to instructions from EGM processor board 203, provided to the player in the form of coins, credits or currency via I/O board and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In an embodiment, the remote storage device is housed in a remote server such as a downloadable gaming server. The gaming terminal 10 may access the remote storage device via a network connection, including but not limited to, a local area network connection, a TCP/IP connection, a wireless connection, or any other means for operatively networking components together. Optionally, other data including graphics, sound files and other media data for use with the gaming terminal are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the gaming terminal using USB, serial or Ethernet connections. Each of the respective devices may have upgrades to their firmware utilizing these connections.

GMU 207 includes an integrated circuit board and GMU processor and memory including coding for network communications, such as the G2S (game-to-system) protocol from the Gaming Standards Association, Las Vegas, Nev., used for system communications over the network. As shown, GMU 207 may connect to the card reader 32 (shown as 255 in FIG. 2A) through bus 257 and may thereby obtain player information and transmit the information over the network through bus 241. Gaming activity information may be transferred by the EGM Processor Board 203 to GMU 207 where the information may be translated into a network protocol, such as S2S, for transmission to a server, such as a player tracking server, where information about a player's playing activity may be stored in a designated server database. This information may include time, machine identification data, coin-in, coin-out, jackpots or other information.

PID 209 includes an integrated circuit board, PID processor (iView CPU), and memory which includes an operating system, such as Windows CE, a player interface program which may be executable by the PID 209 processor together with various input/output (I/O) drivers for respective devices which connect to PID processor and which may further include various games or game components playable on PTM 28, 211 or playable on a connected network server and PTM 28, 211 is operable as the player interface. PID 209 connects to card reader 32 (shown as 255 in FIG. 2A) through bus 223, player tracking display 30 (shown as iView display 229 in FIG. 2A) through video decoder 261 and bus 221, such as an LVDS or VGA bus.

As part of its programming, the PID 209 processor executes coding to drive player tracking display 30, 229 and provide messages and information to a player. Touch screen circuitry 263 interactively connects PTM display 30, 229 and video decoder 261 to PTM 28, 211 such that a player may input information and causes the information to be transmitted either on the player's initiative or responsive to a query. Additionally soft keys 262 connect through bus 217 to PID 209 and operate together with the player tracking display 30 to provide information or queries to a player and receive responses or queries from the player. PID 209, in turn, communicates over the CMS/SMS network through Ethernet switch 231 and busses 235, 239 and with respective servers, such as a player tracking server.

PTMs 28 provide a link between the virtual private WAN/LAN network of the system components and the gaming terminal 10. The system components include the player tacking module 28 (e.g. Bally iVIEW® device) ("iView" is a registered trademark of Bally Gaming, Inc.), PID 209, EGM processing board 203 and game monitoring unit (GMU) processing board 207. These system components may connect over a network to the slot management system (such as a commercially available Bally SDS/SMS) and/or casino management system (such as a commercially available Bally CMP/CMS).

The GMU 207 system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to installation on the system components.

The system components include the PTM 28 processing board (PID 209) and game monitoring unit (GMU) 207. The GMU 207, PID 209 and PTM 28 can be combined into one like the commercially available Bally GTM iVIEW device. The PTM 28 may also interface with a switcher and router device of the type described above. In such case, instead of providing the PTM display 30, the switcher and router device provides for the content normally display at the PTM display 30 to be displayed at one or more of the primary or secondary displays 14, 18.

Figure 3:
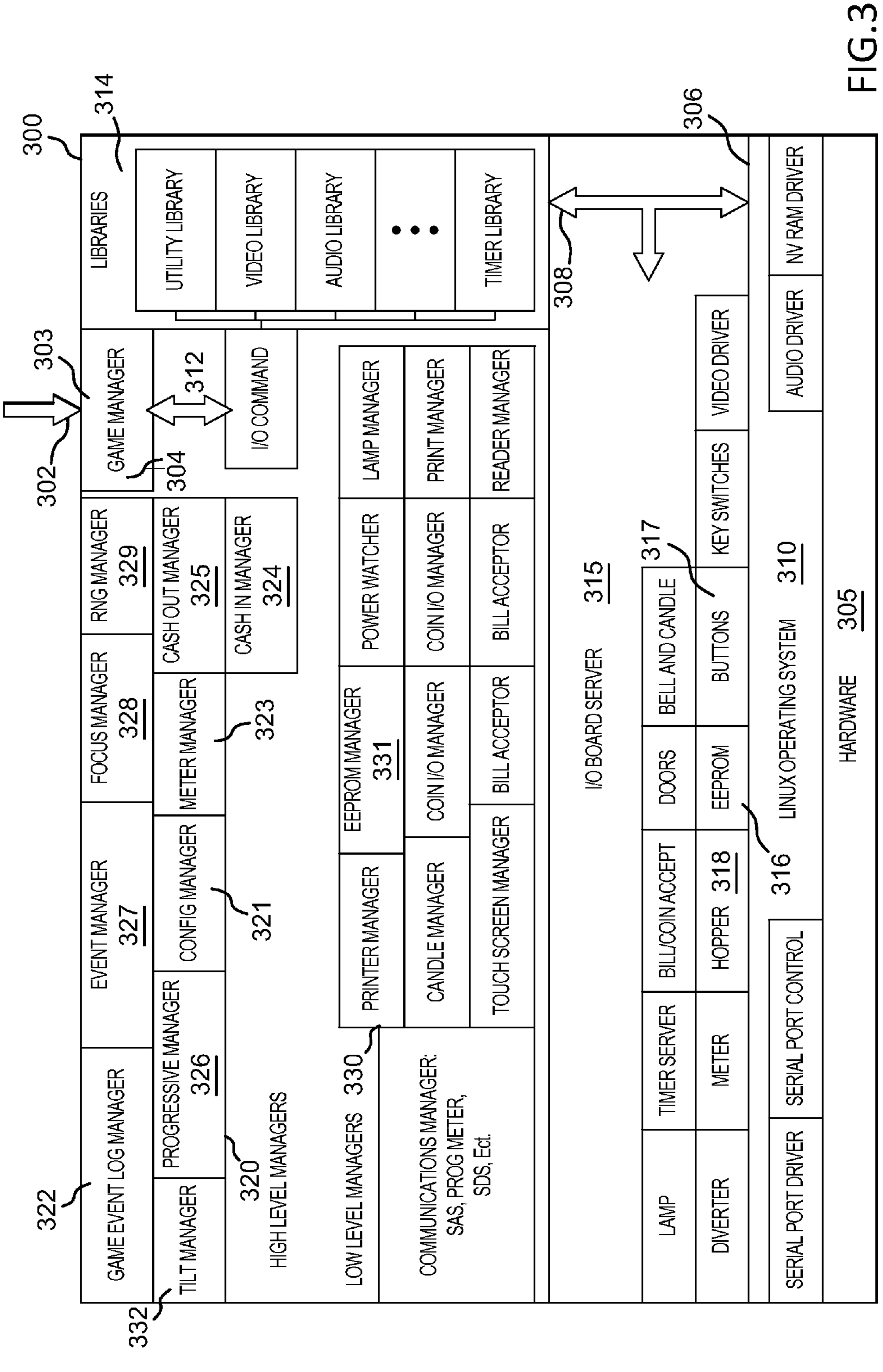
FIG. 3 is a block diagram of the logical components of a gaming kernel for a gaming terminal.

In accordance with one or more embodiments, FIG. 3 is a functional block diagram of a gaming kernel 300 of a game program under control of gaming terminal 10 EGM processor board 203. The game program uses gaming kernel 300 by calling into application programming interface (API) 302, which is part of game manager 304. The components of game kernel 300 as shown in FIG. 3 are only illustrative, and should not be considered limiting. For example, the number of managers may be changed, additional managers may be added or some managers may be removed without deviating from the scope and spirit of the invention.

As shown in the example, there are three layers: a hardware layer 306; an operating system layer 308, such as, but not limited to, Linux; and a game kernel layer having game manager 304 therein. In one or more embodiments, the use of an operating system layer 310, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel 300 executes at the user level of the operating system layer 308, and itself contains a major component called the I/O board server 315. To properly set the bounds of game application software (making integrity checking easier), all game applications interact with gaming kernel 300 using a single API 302 in game manager 304. This enables game applications to make use of a well-defined, consistent interface, as well as making access points to gaming kernel 300 controlled, where overall access is controlled using separate processes.

For example, game manager 304 parses an incoming command stream and, when a command dealing with I/O comes in (arrow 312), the command is sent to an applicable library routine 314. Library routine 314 decides what it needs from a device, and sends commands to I/O board server 310 (see arrow 308). A few specific drivers remain in operating system layer 310's kernel, shown as those below line 306. These are built-in, primitive, or privileged drivers that are (i) general (ii) kept to a minimum and (iii) are easier to leave than extract. In such cases, the low-level communications is handled within operating system layer 310 and the contents passed to library routines 314.

Thus, in a few cases library routines may interact with drivers inside operating system layer 310, which is why arrow 308 is shown as having three directions (between library routines 314 and I/O board server 315, or between library routines 314 and certain drivers in operating system layer 306). No matter which path is taken, the logic needed to work with each device is coded into modules in the user layer of the diagram. Operating board server layer 306 is kept as simple, stripped down, and common across as many hardware platforms as possible. The library utilities and user-level drivers change as dictated by the game cabinet or game machine in which it will run. Thus, each game cabinet or game machine may have an industry standard EGM EGM processing board 203 connected to a unique, relatively dumb, and as inexpensive as possible I/O adapter board, plus a gaming kernel 300 which will have the game-machine-unique library routines and I/O board server 315 components needed to enable game applications to interact with the gaming machine cabinet. Note that these differences are invisible to the game application software with the exception of certain functional differences (i.e., if a gaming cabinet has stereo sound, the game application will be able make use of API 302 to use the capability over that of a cabinet having traditional monaural sound).

Game manager 304 provides an interface into game kernel 300, providing consistent, predictable, and backwards compatible calling methods, syntax, and capabilities by way of game application API 302. This enables the game developer to be free of dealing directly with the hardware, including the freedom to not have to deal with low-level drivers as well as the freedom to not have to program lower level managers 330, although lower level managers 330 may be accessible through game manager 304's interface if a programmer has the need. In addition to the freedom derived from not having to deal with the hardware level drivers and the freedom of having consistent, callable, object-oriented interfaces to software managers of those components (drivers), game manager 304 provides access to a set of high level managers 320 also having the advantages of consistent callable, object-oriented interfaces, and further providing the types and kinds of base functionality required in casino-type games. Game manager 304, providing all the advantages of its consistent and richly functional game application API 302 as supported by the rest of game kernel 300, thus provides a game developer with a multitude of advantages.

Game manager 304 may have several objects within itself, including an initialization object (not shown). The initialization object performs the initialization of the entire game machine, including other objects, after game manager 304 has started its internal objects and servers in appropriate order. In order to carry out this function, the kernel's configuration manager 321 is among the first objects to be started; configuration manager 321 has data needed to initialize and correctly configure other objects or servers.

The high level managers 320 of game kernel 300 may include game event log manager 322 which provides, at the least, a logging or logger base class, enabling other logging objects to be derived from this base object. The logger object is a generic logger; that is, it is not aware of the contents of logged messages and events. The game event log manager's 322 job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 323 manages the various meters embodied in the game kernel 300. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 323 receives its initialization data for the meters, during start-up, from configuration manager 321. While running, the cash in manager 324 and cash out manager 325 call the meter manager's 323 update functions to update the meters. Meter manager 323 will, on occasion, create backup copies of the soft meters by storing the soft meters' readings in EEPROM. This is accomplished by calling and using EEPROM manager 331.

In accordance with still other embodiments, progressive manager 336 manages progressive games playable from the game machine. Event manager 327 is generic, like game event log manager 327, and is used to manage various gaming machine events. Focus manager 328 correlates which process has control of various focus items. Tilt manager 332 is an object that receives a list of errors (if any) from configuration manager 321 at initialization, and during game play from processes, managers, drivers, etc. that may generate errors. Random number generator manager 329 is provided to allow easy programming access to a random number generator (RNG), as a RNG is required in virtually all casino-style (gambling) games. Random number generator manager 329 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 325 has the responsibility of configuring and managing monetary output devices. During initialization, cash out manager 325, using data from configuration manager 321, sets the cash out devices correctly and selects any selectable cash out denominations. During play, a game application may post a cash out event through the event manager 327 (the same way all events are handled), and using a call back posted by cash out manager 325, cash out manager 325 is informed of the event. Cash out manager 325 updates the credit object, updates its state in non-volatile memory, and sends an appropriate control message to the device manager that corresponds to the dispensing device. As the device dispenses dispensable media, there will typically be event messages being sent back and forth between the device and cash out manager 325 until the dispensing finishes, after which cash out manager 325, having updated the credit manager and any other game state (such as some associated with meter manager 323) that needs to be updated for this set of actions, sends a cash out completion event to event manager 327 and to the game application thereby. Cash in manager 324 functions similarly to cash out manager 325, only controlling, interfacing with, and taking care of actions associated with cashing in events, cash in devices, and associated meters and crediting.

In a further example, in accordance with one or more embodiments, I/O board server 315 may write data to the gaming machine EEPROM memory, which is located in the gaming machine cabinet and holds meter storage that must be kept even in the event of power failure. Game manager 304 calls the I/O library functions to write data to the EEPROM. The I/O board server 315 receives the request and starts a low priority EEPROM manager 331 thread within I/O board server 315 to write the data. This thread uses a sequence of 8 bit command and data writes to the EEPROM device to write the appropriate data in the proper location within the device. Any errors detected will be sent as IPC messages to game manager 304. All of this processing is asynchronous.

In accordance with one embodiment, button module 317 within I/O board server 315, polls (or is sent) the state of buttons every 2 ms. These inputs are debounced by keeping a history of input samples. Certain sequences of samples are required to detect a button was pressed, in which case the I/O board server 315 sends an inter-process communication event to game manager 304 that a button was pressed or released. In some embodiments, the gaming machine may have intelligent distributed I/O which debounces the buttons, in which case button module 317 may be able to communicate with the remote intelligent button processor to get the button events and simply relay them to game manager 304 via IPC messages. In still another embodiment, the I/O library may be used for pay out requests from the game application. For example, hopper module 318 must start the hopper motor, constantly monitor the coin sensing lines of the hopper, debounce them, and send an IPC message to the game manager 304 when each coin is paid.

Further details, including disclosure of lower level fault handling and/or processing, are included in U.S. Pat. No. 7,351,151 issued Apr. 1, 2008 entitled "Gaming Board Set and Gaming Kernel for Game Cabinets" the disclosure of which is incorporated herein by explicit reference.

Figure 4A:
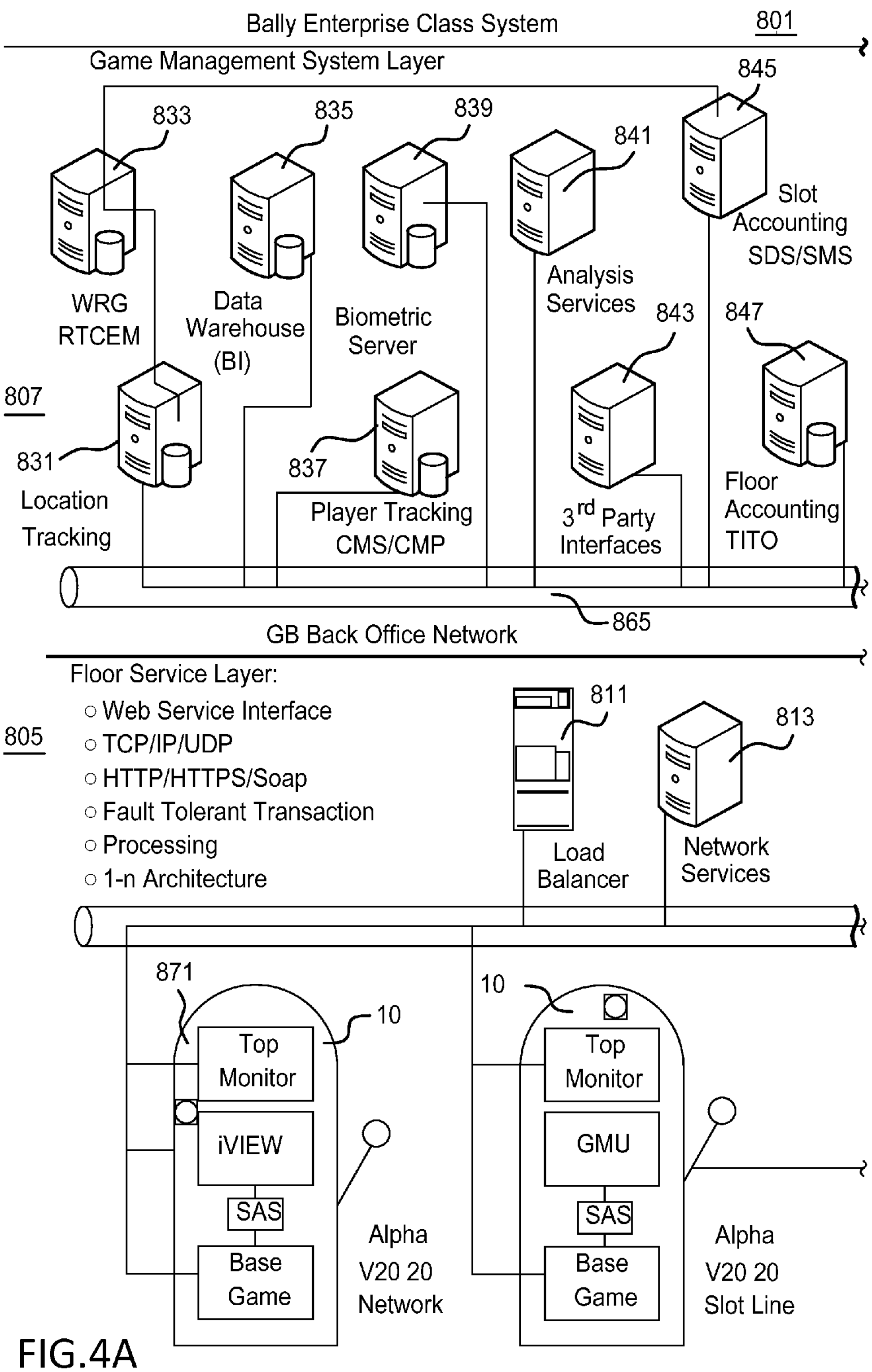
FIGS. 4A and 4B is a schematic of an example of a casino enterprise network incorporating gaming terminals.
Figure 4B:
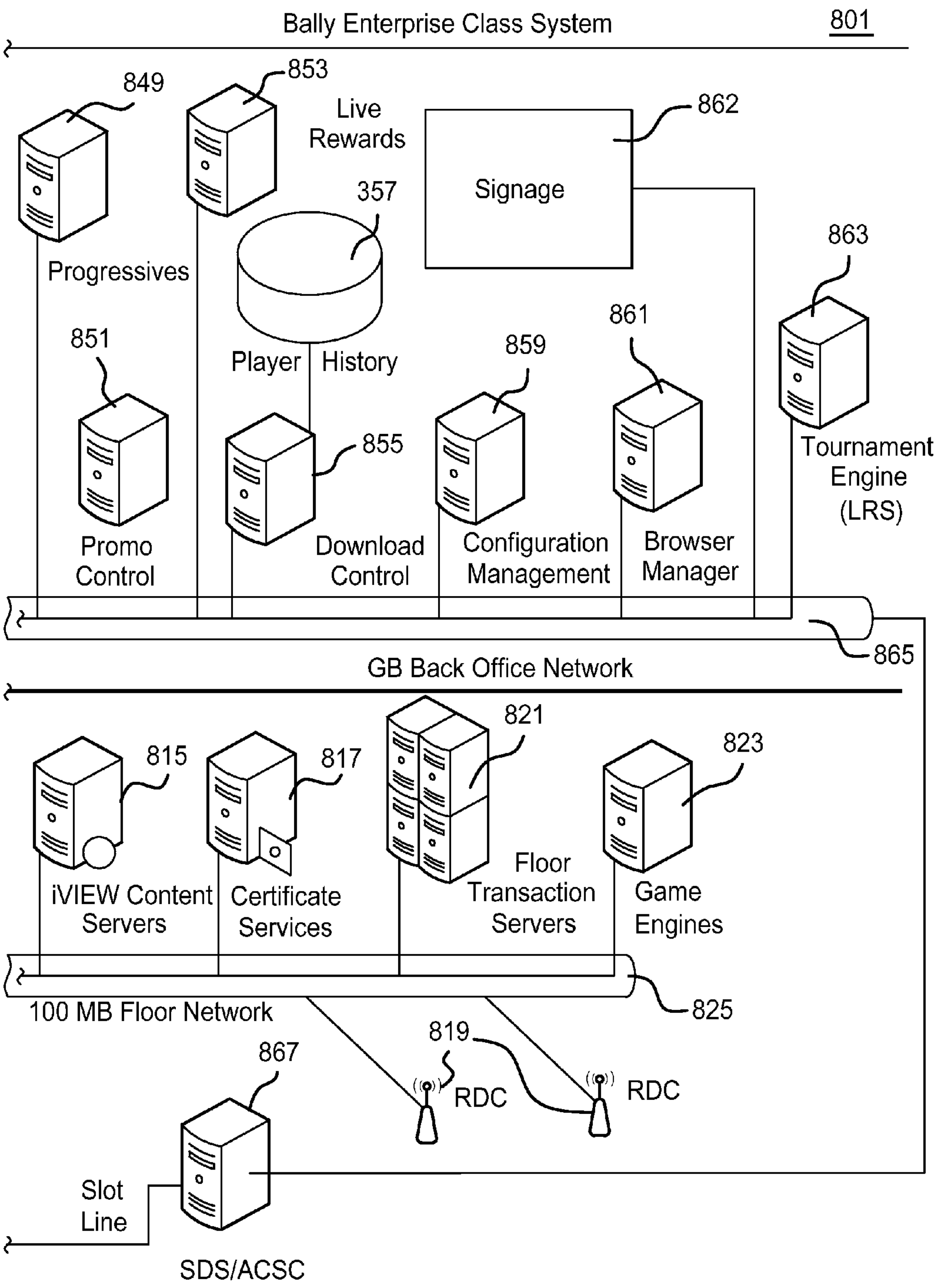

Referring to FIGS. 4A and B, an example of a gaming enterprise system 801 is shown in accordance with one or more embodiments. Gaming enterprise system 801 may include one casino or multiple locations (herein referred to collectively as a casino enterprise) and generally includes a network of gaming terminals 10, floor management system (SMS) 805, and casino management system (CMS) 807. SMS 805 may include load balancer 811, network services server 813, player tracking module 28, iView (PTM 28), content servers 815, certificate services server 817, floor radio dispatch receiver/transmitters (RDC) 819, floor transaction servers 821 and game engines 823 (where the gaming terminals 10 operate server based, server supported or downloadable games), each of which may connect over network bus 825 to gaming terminals 10. CMS 807 may include location tracking server 831, WRG RTCEM (William Ryan Group Real Time Customer Experience Management from William Ryan Group, Inc. of Sea Girt, N.J.) server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming terminals 10. The various servers and gaming terminals 10 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming terminals 10. SMS 805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

The gaming terminals 10 include various peripheral components that may be connected with USB, serial, parallel, RS-485 or Ethernet devices/architectures to the system components within the respective gaming machine. The GMU (shown as GMU 206 in FIG. 2A) has a connection to the base game through a serial SAS connection. The system components in the gaming cabinet may be connected to the servers using HTTPs or G2S protocols over Ethernet. Using CMS 807 and/or SMS 805 servers and devices, firmware, media, operating systems, and configurations may be downloaded to the system components of respective gaming devices for upgrading or managing floor content and offerings in accordance with operator selections or automatically depending upon CMS 807 and SMS 805 master programming. The data and programming updates to gaming terminals 10 are authenticated using conventional techniques prior to install on the system components.

In various embodiments, any of the gaming terminals 10 may be a mechanical reel spinning slot machine, video slot machine, video poker machine, video Bingo machine, Keno machine, or a gaming device offering one or more of the above described games including an interactive wheel feature. Alternately, gaming terminals 10 may provide a game with an accumulation-style feature game as one of a set of multiple primary games selected for play by a random number generator, as described above. A gaming system 801 of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in Vallejo et al U.S. Published Application 2008/0139305, entitled "Networked System and Method for Group Gaming," filed on Nov. 9, 2007, which is hereby incorporated by reference in its entirety for all purposes.

The gaming system 801, among other functionalities such as slot accounting (i.e. monitoring the amount wagered ("drop"), awards paid) and other casino services, includes the player tracking CMS/CMP server 837 and/or data structure warehouse 835 storing, in individual player accounts, predetermined types of data. This data includes personal data for players enrolled in the casino players club sometimes referred to as a loyalty club. An example of the personal data is the player's name, address, SSN, birth date, spouse's name and perhaps personal preferences such as types of games, preferences regarding promotions, a player's commercial activity such as wagers made during a gaming session and other tracked spending (hotel, dinning, services such a spa) a player rating level usually based at least in part on the player's "spend" with the casino, particularly for gaming, available player comp points (points accumulated also based at least in part upon commercial "spend" activity and which may be redeemed or converted into cash or redeemed in exchange for services or merchandise) and the like. As is known in the industry and according to the prior art, at enrolment the player is assigned a created player account in the player tracking CMS/CMP server 837 and is issued a player tracking card having a machine readable magnetic stripe to tie the player to the activity and their account.

When a player plays a gaming terminal 10, he/she inserts their player tracking card into the card reader 32 (FIG. 1) which communicates data to the CMS/CMP server 837 to accumulate activity data such as wagers (perhaps cumulative wagers between insertion of the card and removal of the card or a time-out period where no wagers have been made), wins or jackpots, session time, gaming terminal associated with the session and the like.

The system 801 may also include electronic transfer of funds functionality. For example, a player having accumulated $100 at a gaming terminal 10 may decide to "cash out" to play another gaming terminal 10. The player, for example using the PTM 28 to initiate communication with the system 801 for example server 837 to upload the value from the gaming terminal 10 into an electronic account associated with the player's account. The player may choose to upload all or a portion of the funds the player's established electronic account. The system would prompt the player to enter their PIN (or obtain biometrical confirmation as to the player's identity) and upload the chosen amount to their account. When the player moves to another gaming terminal 10 he/she inserts their player loyalty card into the card reader 32 to access their account. A prompt provides for the player to request funds from their account. Entering their PIN (or biometric identifier) the player can input the desired amount which is downloaded to their gaming terminal 10 for play.

Figure 5:
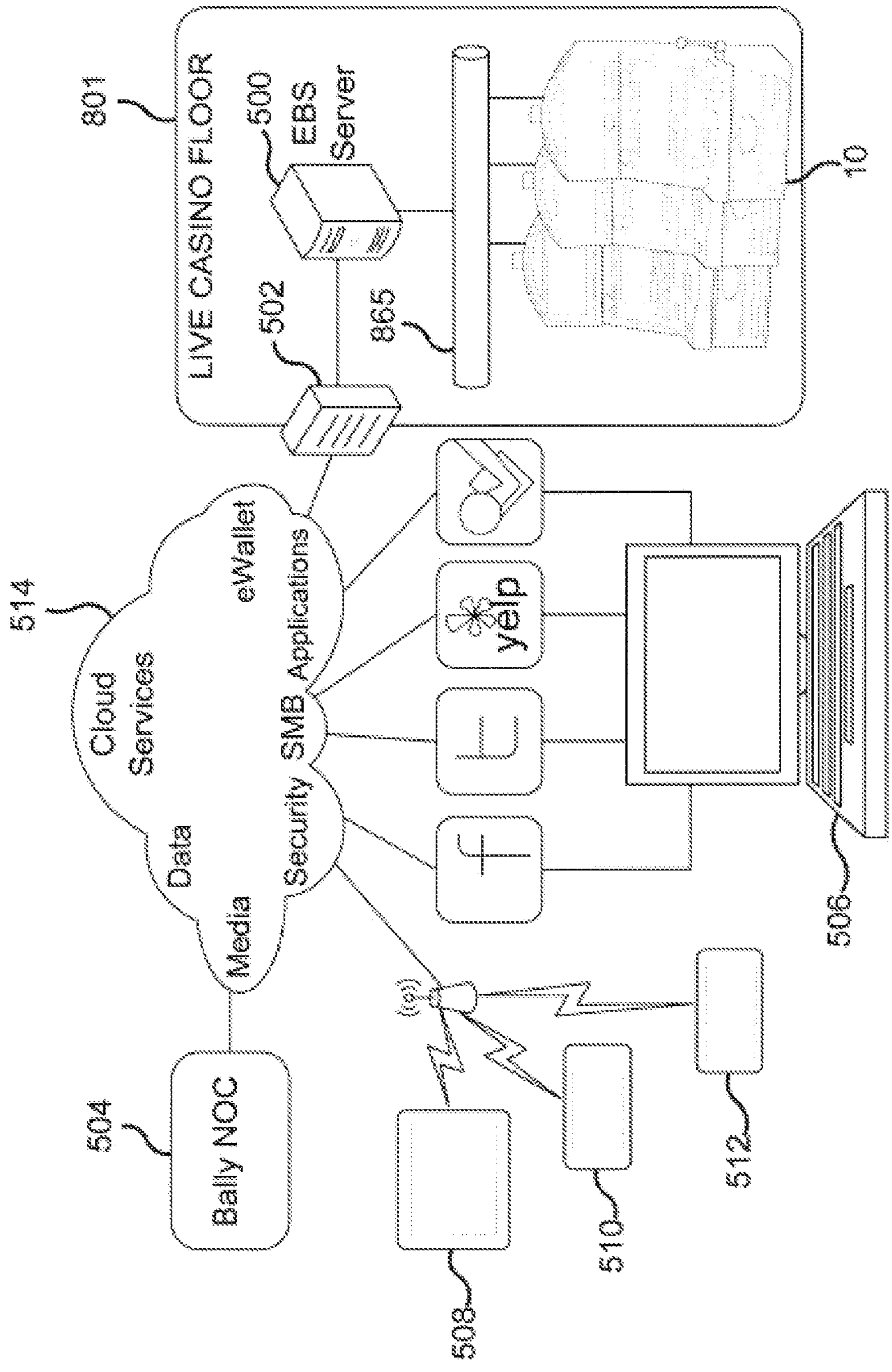
FIG. 5 is a diagram showing an example of an architecture for tying a casino enterprise network to an external provider of games and content to Internet or broadband communication capable devices.

Portions of the present invention may be implemented, augmented or promoted by or through a system as suggested in FIG. 5. At 801 is the gaming enterprise system which may be hosted at a casino property enterprise, across several casino enterprises or by a third party host. As described above the gaming enterprise system 801 has a network communication bus 865 providing for communication between the gaming devices 10 and various servers as described above with respect to FIGS. 4A,B. To provide the functionality illustrated in FIG. 5, a host server 500, such as a Bally Elite Bonusing Server (EBS), is connected to the network communication bus 865 for communication to the gaming system 801, the gaming terminals 10 and the various servers and other devices as described above. Through a secure network firewall 502 the host server 500 is in communication with a cloud computing/storage service 514 which may be hosted by the casino enterprise, a licensed third party or if permitted by gaming regulators an unlicensed provider. For example the cloud service 514 may be as provided by Microsoft® Private Cloud Solutions offered by Microsoft Corp. of Redmond, Wash., USA. The cloud service 514 provides various applications which can be accessed and delivered to, for example, personal computers 506, portable computing devices such as computer tablets 508, personal digital assistants (PDAs) 510 and cellular devices such as telephones and smart phones 512 collectively referred to herein as player portable communication devices (PMCDs). For example the cloud service 514 may provide and support the enterprise applications in association with the feature server 500. The cloud service 513 may also facilitate the delivery of content to user/players by supporting updates and advertising through the enterprise applications to the remote device user/player. The cloud service 514 includes security provide for secure communication with the cloud service 514 between the player/users and the cloud service 514 and between the cloud service 514 and the gaming enterprise system 801. Security applications may be through encryption, the use of personal identification numbers (PINS), biometric identification, location determination or other devices and systems. As suggested in FIG. 5 the cloud service 515 stores or accesses player/user data retrieved from players/users and from the gaming enterprise system 801 and host server 500 and associated one or more data structures.

The players/users may access the cloud service 514 and the applications and data provided thereby through the Internet or through broadband wireless cellular communication systems and any intervening sort range wireless communication such as WiFi, NFC, Bluetooth or the like. The players/users may access the applications and data through various social media offerings such as Facebook, Twitter, Yelp, MySpace or LinkedIn or the like. As described herein the cloud service 514 and enterprise system 801 provides a vehicle through which software applications suitable to the various PMCDs to configure the same for the purposes as hereinafter described. The player may access/download the application from the host server 500 prior to engaging in gaming activity for visiting the casino enterprise or may access/download the application when he/she desires to use the functionality as hereinafter described.

On an individual basis, as but an example, a player/user may have an established player account with a casino enterprise. That account may include data such as the player's credit level, their rating and their available comps. At their PMCD the player/user may download a suitable application form the host 500 which is configured for accessing and displaying account information. Through this application sends a request to the cloud service 514 to request a the status of their available comps such as how many comp points they have and what may be available through redemption of those points (e.g. lodging, cash back, meals or merchandise). The application for the request access the information and may format and present casino promotions, graphics or other advertising to the player/user. The application, to support such a request, would typically require the player/user to enter a PIN or some other unique identifier such as a biometric identifier or tag. The cloud service 514 forwards the inquiry to the host server 500 which, in turn, confirms the identification and retrieves the requested information from the data warehouse 835 or player history database 857 or player tracking CMS/CMP server 837. The information is formatted by the cloud service 514 and/or downloaded application and delivered to the player/user. The delivery may be formatted based upon the player/user's device operating system (OS), display size or the like.

The cloud service 514 may also host game applications to provide virtual instances of games for free, promotional, or where permitted, P2P (Pay to Play) supported gaming. Third party developers may also have access to placing applications with the cloud service 514 through, for example a national operations center (Bally NOC 504). A game software manufacturer such as Bally Gaming, Inc. may also provide game applications on its own or on behalf of the casino enterprise.

Other media such as advertising, notices (such as an upcoming tournament) promotions and surveys may also be provided to and through the cloud service 514. When a player/user accesses the cloud service 514 certain media may be delivered to the player/user in a manner formatted for their application and device.

The cloud service 514 enables the casino enterprise to market to and foster player loyalty. To drive such interaction various incentive programs may be employed including, as described above, users earning or being awarded mystery game chances which may be redeemed at their next visit to the casino enterprise or, where permitted, during play on their remote devices. As described herein the cloud service 514 enables the user/player to access and interact with their one or more virtual objects.

The cloud service 514 may be replaced or augmented with an Internet accessible enterprise web portal to provide the functionalities described herein.

As described above, gaming terminals 10 are designed to be operated by a player seated in front of the terminal to use the gaming terminal player interface buttons and touch screens. One drawback is that the player cannot significantly adjust their seating position, for example to turn to the side, and still easily access the interfaces. Shorter player may have difficulty reaching the various interfaces and over time may become fatigued by the required positioning of their hands and fingers. Still further diseases such as influenza and colds can be transferred by one player touching the buttons/screens touched by prior, ill player. Players may feel more comfortable using their own device to interface with a gaming terminal.

Figure 6:
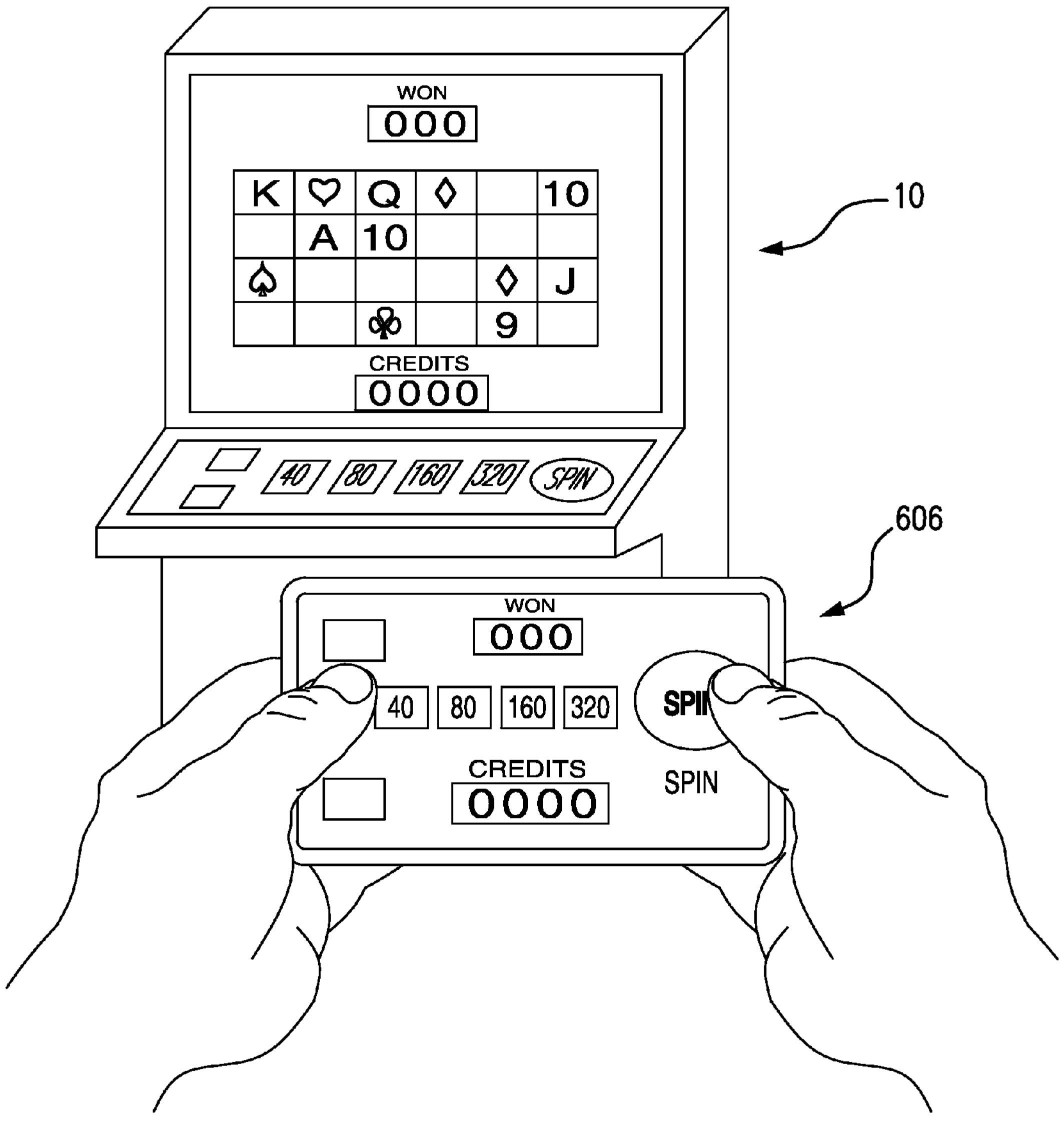
FIG. 6 illustrates an embodiment where the player has established a link between their player mobile communication device (PMCD) and a gaming terminal interface.
Figure 10:
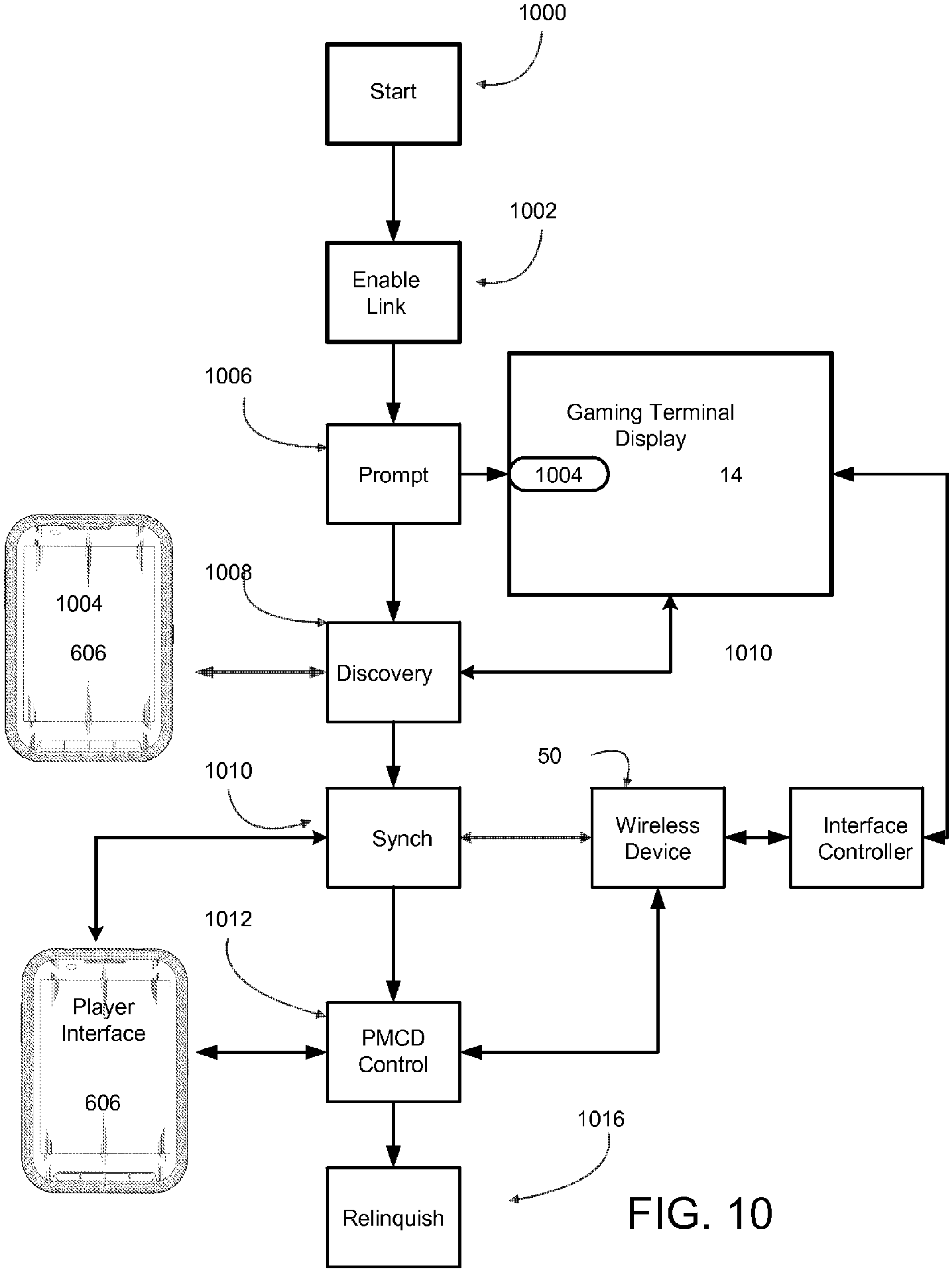
FIG. 10 is a logic diagram showing the linking or synching of the player's PMCD to the gaming terminal.

Turning to FIGS. 1, 6 and 10 an embodiment of the present invention will be described. Modern PMCD devices include, in addition to a computer processor and wireless communication devices (GSM/CDMA network), broadband and near field communication (e.g. Bluetooth® devices, several devices and features which include a digital camera, a video display, gyroscopic sensors to measure and maintain orientation and monitor and control device positions, orientations direction angular motion and rotation and an accelerometers to measure acceleration as well as tilt, tilt angle, incline, rotation, vibration, collision and gravity. In FIG. 1 there is graphically illustrated a player PMCD 606 (e.g. Smart phone) as well as a wireless transceiver device 50 for the gaming terminal 10 and in communication with the gaming terminal processor(s) and/or button deck and touch screen interfaces. The wireless transceiver device 50 may be an aftermarket device installed within the gaming terminal 10 or it may be included in a gaming terminal processor such as EGM Processor Board 203 or GMU 207. It may also be included into player interface device 211. For example a Bluetooth configured wireless device 50 may be installed into the gaming terminal 10 or included in the gaming terminal motherboard or the like. The device 50 may also be a wireless router or other wireless device configured for communication with PMCDs 606.

With specific reference to FIG. 10 at 1000 a player starts the process by presenting their PMCD 606 and activating a gaming terminal 10. This activation of the gaming terminal 10 may be by any suitable means including establishing wagering credits at the gaming terminal 10 (inserting cash or a voucher ticket or downloading funds to the gaming terminal 10) or simply touching a button or touch screen interface to awaken the gaming terminal from its idle, attract or standby mode. Using their PMCD 606 the player then is tasked to establish a unique and secure link between the players's PMCD 606 and the selected gaming terminal 10. In regards to this link it is important that it be tied to the specific gaming terminal 10 intended to be played by the player to prevent unintended control of an adjacent gaming terminal 10 or a passerby obtaining control. In an embodiment when the player decides to obtain control though their PMCD the player at 1002 enables their Bluetooth feature for compatible devices to "Find" the player's PMCD. At the gaming terminal 10 using a player interface 1004 (button or touch screen interface) the player prompts at 1006 the wireless transceiver device 50 to a "Discovery" mode at 1008. At the player's PMCD 606 the player looks at its video display indicating the gaming terminal 10 wireless communication device 50 has at 1008 been found whereupon at 1010 the player accepts the communication link and the synching of their PMCD to the wireless device 50 and the gaming terminal 10. At 1012 the player's PMCD through one or more software applications downloaded to the PMCD 606 previously from an Internet site or the lie or downloaded from the gaming terminal 10 when the PMCD 606 is "synched", the control of one or more inputs to the gaming terminal 10 is now transferred to the player's PMCD 606. The one or more software applications at the PMCD 606 or wireless device 50 or gaming terminal interface controller 1014 controls the PMCD 606 to display a user interface commensurate with the control allotted to the PMCD 606.

Turning to FIG. 6 an example of the display at the player's PMCD 606 is shown. The PMCD 606 includes a plurality of interface buttons which may replicate the layout and functions of the buttons on the selected gaming terminal 10. These buttons may include a spin button which if touched by the player at their PMCD 606 video display prompts the play of a game, wager amount buttons to select the level of wagers, a cash out button for the player to collect their accumulated credits and the like. In an embodiment the buttons for the gaming terminal 10 are replicated at the PMCD 606. In another embodiment only certain buttons and prompts are allotted to the PMCD 606. In an embodiment even though one or more functions and controls have been allotted to the player's PMCD 606 the control may be shared. For example the player may use the gaming terminal to enter wagers and select propositions but use their PMCD to initiate the plays or spins.

Figure 7:
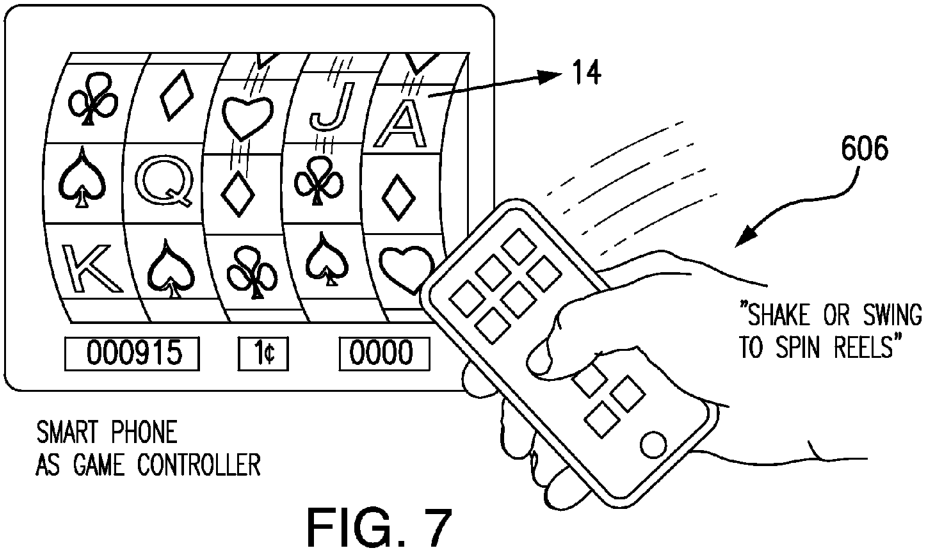
FIG. 7 illustrates an embodiment where the player has established a link between their player mobile communication device (PMCD) and a gaming terminal interface for controlling an aspect of the gaming machine using a gesture with the PMCD.
Figure 8:
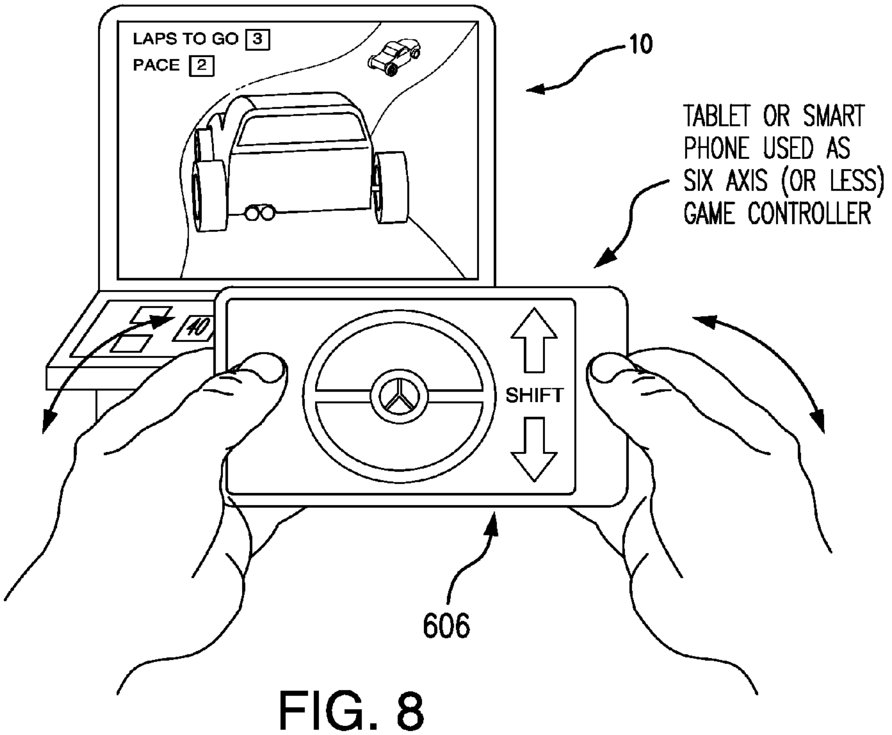
FIG. 8 illustrates an embodiment where the player has established a link between their player mobile communication device (PMCD) and a gaming terminal interface for controlling an interactive feature of the gaming terminal shown as a steering a vehicle.
Figure 9:
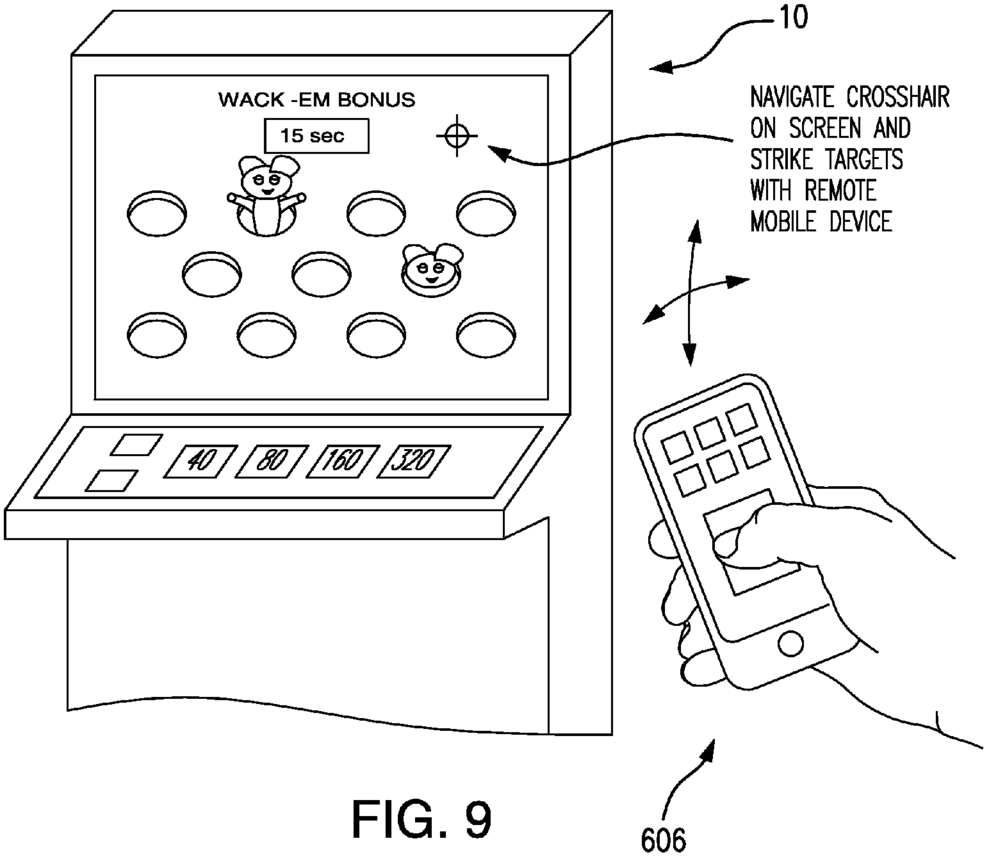
FIG. 9 illustrates an embodiment where the player has established a link between their player mobile communication device (PMCD) and a gaming terminal interface and uses gestures with the PMCD for controlling another interactive feature of a gaming machine shown as a "whack-a-mole" feature.

FIG. 7 shows the use of a PMCD 606 to initiate a spin. In this embodiment the one or more software applications accessed by the PMCD 606 enable the PMCD 606 to initiate a feature through a movement gesture such as a "swiping" motion. The accelerometers and gyroscopic sensors in the PMCD 606 detect the motion and through the wireless connection prompt the gaming terminal 10 game displayed at the primary display 14 to initiate a spin. FIG. 8 shows another example of gesture control using the PMCD 606. In this illustrative embodiment a feature of the game includes the player steering a vehicle. When the feature is provided the PMCD 606 display is controlled to display a steering wheel and the player may rotate their PMCD 606 which rotation is detected by the accelerometers and gyroscopes to, through the wireless connection, control the steering input for the feature. FIG. 9 shows the use of the PMCD 606 to control a cursor displayed at the primary game display 14 to initiate a player input such as striking an object in a Whack-a-Mole game. The player moves their PMCD 606 to position the cursor and then may depress a button or use a striking gesture to simulate whacking the selected object.

Returning to FIG. 10, when the gaming terminal 10 has exhausted game credits and/or is idle for a period of time, or as selected by the player, the wireless link with the PMCD 606 may be terminated at 1016 and the joint control (or exclusive control) for the player interface returned to the buttons 20 and touch screen displays. When the link has been severed the player must re-synch their PMCD 606 with the gaming terminal 10 to again allocate the joint or exclusive control of the player interfaces to the PMCD 606.

Figure 11:
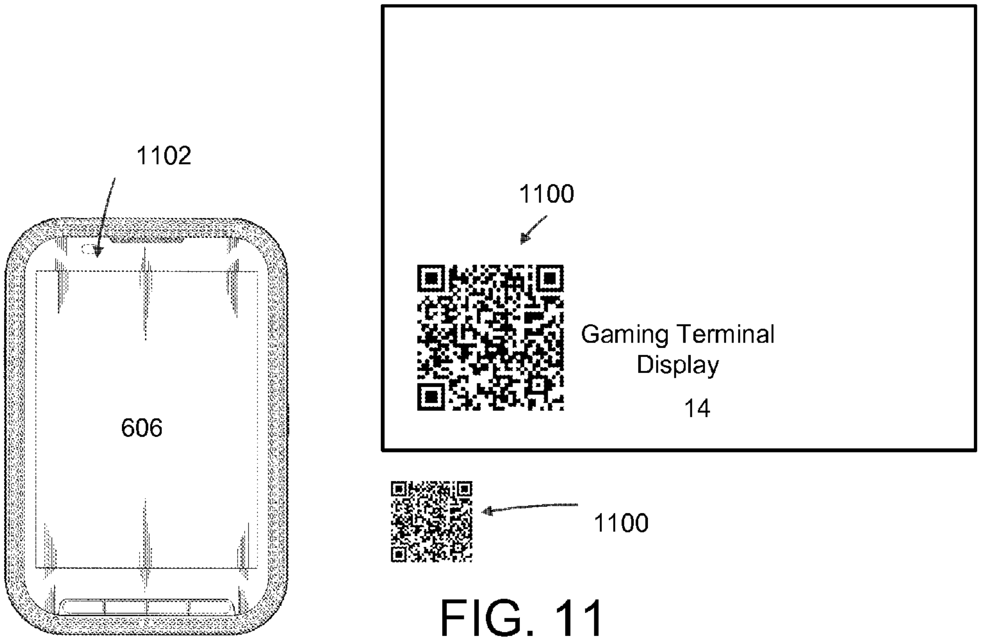
FIG. 11 shows an embodiment the gaming terminal displaying an image such as a QR code for synching the PMCD to the gaming terminal.

Turning to FIG. 11 in an embodiment the gaming terminal 10 may display at one of its video displays a graphic, image, hidden water mark, serial number or icon such as a bar code or QR code 1100 and/or a unique bar code, QR code or serial or machine asset number may be a decal or other imprinted image on the gaming terminal 10. Using the onboard camera of the PMCD 606 the player may photograph the QR code 1100 to facilitate or assist in synching the PMCD 606 to the gaming terminal 606.

Figure 12:
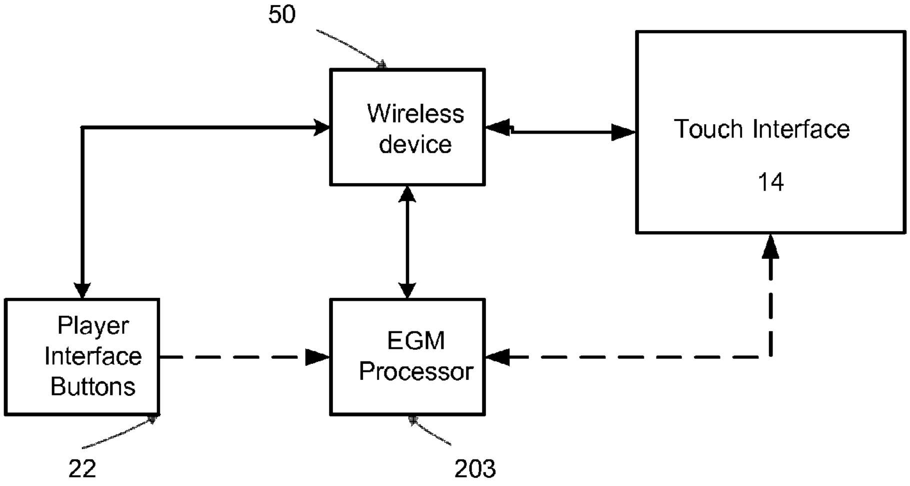
FIG. 12 illustrates incorporation of a wireless device into a gaming terminal 10.

FIG. 12 illustrates incorporation of the wireless device 50 into a gaming terminal 10. Inasmuch as the wireless connection and resultant control does affect game operation regulators may require the wireless device 50 be associated equipment rather than being incorporated directly into the game motherboard and processor. According to FIG. 12 the gaming terminal 10 player interfaces consist of the buttons 20 and touch screens 14 representatively shown in the drawing. During normal operation the player uses these player interfaces to input prompts required for the play of the game. For example, these prompts may be selecting propositions (e.g. how may lines to play), features, wager amounts, cash out commands, uploading and downloading funds, selecting different games in a multi-game gaming terminal 10, calling an attendant and interaction during the game such as making selections or controlling a feature. The wireless device 50, including processing capabilities, is installed in the gaming terminal cabinet 12 and is communicatively coupled between the player input interfaces of, for example, the touch input enabled primary game display 14 and the buttons 20. When the player has synched their PMCD 606 to the wireless device 50 the signals input by the player at their PMCD 606, now acting as an auxiliary player input device, are communicated to the EGM processor 203 in a form for processing and are interpreted as corresponding inputs from the touch input enabled primary game display 14 and the buttons 20 to control the game. In an embodiment, as discussed above, the PMCD 606 may share player interface capabilities with the touch input enabled primary game display 14 and buttons 20. In an alternative embodiment the one or more software applications for the PMCD 606, EGM processor 203 and couplings may disable the existing gaming terminal 10 player interfaces in favor of the interfaces provided by the PMCD 606.

In an embodiment the player may be able to wirelessly synch their PMCD 606 to adjacent gaming terminals 10 to play them together. For example after synching and using the buttons 20 for each gaming terminal 10 to make their wagers and select the propositions, with a single gesture as depicted in FIG. 7 the player may prompt the play of the gaming terminals 10.

In an embodiment additional features may be provided when the player uses their PMCD 606 to provide the player/gaming terminal 10 interface. For example, the player may download a feature to their PMCD 606 such a providing for the capture to the PMCD 606 of a jackpot win. When a win occurs the player at their PMCD 606 interface may be presented with a "save" button which if touched transmits a graphic representation of the jackpot to the PMCD 606. Other features may include a control for the volume of the gaming terminal 10.

In an embodiment where, for example, the buttons 20 for the gaming terminal 10 displayed on a touch screen enabled virtual button deck (sold by Bally Gaming, Inc d/b/a/ Bally technologies as the iDeck™ device) and as described in U.S. Pub. App. 2010/0113140 entitled "Gesture Enhanced Input Device" filed Nov. 16, 2009 the disclosure of which has been incorporated by reference, the button deck may include the wireless device 50. When the player establishes the link as described above the player interface inputs by the player at their PMCD are interpreted and passed by the button deck wireless device to the EGM processor 203 for controlling the game.

In an embodiment the invention may be utilized with remote terminals such as personal computers for play of social games. The player would initialize the game at their PC and synch their PMCD 606 to provide remote control for game inputs.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. A system for providing for a player to simultaneously control player inputs for a first gaming device and an adjacent second gaming device using a player mobile communication device including a video display and a wireless communicator, said first gaming device including a first game display and a first player interface, and said second gaming device including an second game display and a second player interface, said system comprising:

a first wireless communication device associated with said first gaming device, said first wireless communication device configured to establish a communication link between said mobile communication device and said first gaming device;

a second wireless communication device associated with said second gaming device, said second wireless communication device configured to establish a second communication link between said mobile communication device and said second gaming device; and a software application configured to (a) separately establish the first and second communication links between the respective first and second wireless communication devices and the mobile communication device, (b) control said mobile communication device, said first gaming device, and said second gaming device to (i) share control and (ii) relinquish control of said first player interface and said second player interface to said mobile communication device and (c) control said mobile communication device display to display a visual portion of a gaming device interface, whereby said player simultaneously controls player inputs to said first gaming device and said second gaming device through said gaming device interface of said mobile communication device with a single input.

2. The system of claim 1, wherein said first wireless communication device is configured to synch with said player mobile communication device to establish said communication link.

3. The system of claim 2, wherein said player mobile communication device includes a camera, and wherein said gaming device is configured to display on said first game display an image unique to said first gaming device, said image disposed to be captured by said camera, and wherein said software application is configured to receive data resulting from said captured image to cause said first gaming device and player mobile communication device to synch.

4. The system of claim 1, wherein said first gaming device is configured for play of a game including one or more in-game bonuses, and said software application further configured to enable said play of the game including an additional feature particular to said gaming device interface of said player mobile communication device.

5. The system of claim 4, wherein said additional feature is delivered wirelessly to said player mobile communication device.

6. The system of claim 5, wherein said player mobile communication device is configured for Broadband communications, and wherein said additional feature is delivered via Broadband communication to said player mobile communication device.

7. The system of claim 1, wherein in response to establishment of said communication link between said mobile communication device and said gaming device, said software application is transferred to said mobile communication device.

8. A casino enterprise system including a host server configured to communicate via one or more of an Internet network, a Broadband communication network and a near field communication network communicating with player mobile communication devices (PMCD), a plurality of gaming devices in communication with said host server over a private network each having a respective video display and a respective player input interface enabling a player to interface with said plurality of gaming devices and wherein each of said PMCD includes a respective display and a respective camera, said system comprising:

one or more near field wireless communication devices associated with said plurality of gaming devices, said one or more near field wireless communication devices configured to establish a corresponding unique communication link between a player-operated one of said PMCD and each of a plurality of player-selected gaming devices selected from said plurality of gaming devices when said player is proximate to said plurality of player-selected gaming devices; and one or more software applications configured to (a) separately establish the unique communication links between the one or more field wireless communication devices and the player-operated one of said PMCD, (b) control said player-operated one of said PMCD and said plurality of gaming devices to (i) share control and (ii) relinquish control of said respective player input interfaces of said plurality of player-selected gaming devices to said player-operated one of said PMCD and (c) control said player-operated one of said PMCD to display a visual portion of a gaming device interface, whereby said player simultaneously controls said respective player input interfaces of said plurality of player-selected gaming devices through said gaming device interface of said player-operated one of said PMCD using a single input.

9. The system of claim 8, wherein said one or more software applications is further configured to control each said player-selected gaming device to display an image unique to said player-selected gaming device, each image disposed to be captured by said camera of said player-operated one of said PMCD, and said one or more software applications is further configured to receive data resulting from each corresponding said captured image to cause each said player-selected gaming device and said player-operated one of said PMCD to establish said corresponding unique communication link.

10. The system of claim 8, wherein said host server is further configured to issue to one of said plurality of player-selected gaming devices and said player-operated one of said PMCD a feature accepted through said corresponding unique communication link.

11. The casino enterprise system of claim 8, wherein in response to establishment of said corresponding unique communication links between said player-operated one of said PMCD and said plurality of player-selected gaming devices, at least one of said one or more software applications are transferred to said player-operated one of said PMCD.

12. A method for providing for a player to simultaneously control player inputs for a plurality of gaming devices using a player mobile communication device including a video display and a wireless communicator, each gaming device of said plurality including a respective game display and a respective player interface, said method comprising:

providing a wireless communication device to be associated with each of said plurality of gaming devices, said wireless communication device configured for establishing a corresponding communication link between said mobile communication device and each of said plurality of gaming devices; and one or more software applications configuring said mobile communication device and said plurality of gaming devices for separately establishing the corresponding communication links between the plurality of wireless communication devices and the mobile communication device, and (i) sharing control and (ii) relinquishing control of each said player interface to said mobile communication device, and controlling said mobile communication device display to display a visual portion of a gaming device interface, wherein said gaming device interface simultaneously controls player inputs to said respective player interfaces of said plurality of gaming devices in response to a single input via said gaming device interface of said mobile communication device.

13. The method of claim 12 wherein said player mobile communication device includes a camera, and wherein said method further comprises configuring said plurality of gaming devices to display an image unique to each respective gaming device of said plurality at said respective game display, said image disposed to be captured by said camera, and wherein said one or more software applications configures said player mobile communication device to receive data resulting from each said captured image to cause establishment of a communication link between said mobile communication device and each gaming device of said plurality.

14. The method of claim 12, further comprising:

in response to establishing said corresponding communication links between said mobile communication device and said plurality of gaming devices, transferring at least one of said one or more software applications to said mobile communication device.

15. A computer-implemented method performed by a casino enterprise system including a host server configured to communicate via one or more of an Internet network, a Broadband communication network and a near field communication network communicating with player mobile communication devices (PMCD), a plurality of gaming devices in communication with said host server over a private network each having a respective video display and a respective player input interface enabling a player to interface with respective ones of said plurality of gaming devices and wherein each of said PMCD includes a respective display and a respective camera, said method comprising:

associating one or more near field wireless communication devices with said plurality of gaming devices;

configuring said one or more near field wireless communication devices to establish a corresponding unique communication link between a player-operated one of said PMCD and each of a plurality of player-selected gaming devices selected from said plurality of gaming devices when said player is proximate to said plurality of player-selected gaming devices;

configuring, by one or more software applications, said player-operated one of said PMCD and said plurality of player-selected gaming devices to separately establish the unique communication links between the one or more field wireless communication devices and the player-operated one of said PMCD, and one of sharing and relinquishing control of each said player input interface to said player-operated one of said PMCD and controlling said player-operated one of said PMCD to display a visual portion of a gaming device interface, whereby said player simultaneously controls said respective player input interfaces of said plurality of player-selected gaming devices through said gaming device interface of said player-operated one of said PMCD using a single input.

16. The method of claim 15, wherein said one or more software applications is further configured to control each of said player-selected gaming devices to display an associated unique image, each image disposed to be captured by said camera of said player-operated one of said PMCD as an associated captured image, and said one or more software applications is further configured to receive data resulting from each said captured image to cause each associated said player-selected gaming device and said player-operated one of said PMCD to establish said unique communication link.

17. The method of claim 15, further comprising:

in response to establishing said corresponding unique communication links between said player-operated one of said PMCD and said plurality of player-selected gaming devices, transferring at least one of said one or more software applications to said player-operated one of said PMCD.

* * * * *